(12) United States Patent
Taguchi

(10) Patent No.: US 8,806,367 B2
(45) Date of Patent: Aug. 12, 2014

(54) DISPLAY CONTROL DEVICE AND INPUT DEVICE

(75) Inventor: Hiroyuki Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 672 days.

(21) Appl. No.: 12/659,184

(22) Filed: Feb. 26, 2010

(65) Prior Publication Data
US 2010/0162162 A1 Jun. 24, 2010

Related U.S. Application Data

(63) Continuation of application No. PCT/JP2007/066848, filed on Aug. 30, 2007.

(51) Int. Cl.
| | |
|---|---|
| *G06F 3/048* | (2013.01) |
| *G06F 3/0481* | (2013.01) |
| *G06F 3/0482* | (2013.01) |
| *G06F 3/0483* | (2013.01) |
| *G06F 3/0489* | (2013.01) |
| *G09G 5/14* | (2006.01) |
| *H04N 21/443* | (2011.01) |
| *H04N 21/431* | (2011.01) |
| *H04N 21/432* | (2011.01) |
| *H04N 21/422* | (2011.01) |
| *H04N 21/462* | (2011.01) |

(52) U.S. Cl.
CPC ............ *G06F 3/0481* (2013.01); *G06F 3/0482* (2013.01); *G06F 3/0483* (2013.01); *G06F 3/0489* (2013.01); *G06F 3/04897* (2013.01); *G09G 5/14* (2013.01); *G09G 2340/125* (2013.01); *H04N 21/4438* (2013.01); *H04N 21/4316* (2013.01); *H04N 21/4325* (2013.01); *H04N 21/42204* (2013.01); *H04N 21/4622* (2013.01); *Y10S 715/972* (2013.01)
USPC ........... 715/794; 715/716; 715/718; 715/719; 715/766; 715/790; 715/781; 715/788; 715/796; 715/797; 715/802; 715/972

(58) Field of Classification Search
CPC ... G06F 3/0481; G06F 3/0482; G06F 3/0483; G06F 3/0489; G06F 3/04897; G09G 5/14; G09G 2340/125; H04N 21/4438; H04N 21/4316; H04N 21/4325; H04N 21/42204; H04N 21/4622; Y10S 715/972
USPC ......... 715/791, 794, 796, 716, 718, 719, 766, 715/781, 788, 790, 797, 802, 972
See application file for complete search history.

(56) References Cited

U.S. PATENT DOCUMENTS

| | | | | |
|---|---|---|---|---|
| 5,544,300 | A | * | 8/1996 | Skarbo et al. .................. 715/759 |
| 5,572,649 | A | * | 11/1996 | Elliott et al. ................... 715/788 |

(Continued)

FOREIGN PATENT DOCUMENTS

| | | |
|---|---|---|
| EP | 0 886 964 | 12/1998 |
| EP | 0 888 688 | 1/1999 |

(Continued)

OTHER PUBLICATIONS

English Translation of the International Preliminary Report on Patentability mailed Mar. 18, 2010 in corresponding International Patent Application PCT/JP2007/066848.

(Continued)

*Primary Examiner* — Patrick Riegler
(74) *Attorney, Agent, or Firm* — Staas & Halsey LLP

(57) ABSTRACT

The display control device detects a pressing down of a one-shot media button arranged in a remote controller, receives a report on the detection of the pressing down of the one-shot media button and specifies a window associated with any one of moving picture reproducing applications, and changes the front-back order of the window so that the specified window is displayed on the frontmost surface on a display.

16 Claims, 12 Drawing Sheets

(56) References Cited

U.S. PATENT DOCUMENTS

| | | | |
|---|---|---|---|
| 6,147,715 | A | 11/2000 | Yuen et al. |
| 6,154,203 | A | 11/2000 | Yuen et al. |
| 6,300,951 | B1 * | 10/2001 | Filetto et al. .................. 715/797 |
| 6,441,862 | B1 | 8/2002 | Yuen et al. |
| 6,606,747 | B1 | 8/2003 | Yuen et al. |
| 6,873,341 | B1 * | 3/2005 | Adams et al. ................. 345/629 |
| 6,928,624 | B1 * | 8/2005 | Estipona ....................... 715/790 |
| 6,976,216 | B1 * | 12/2005 | Peskin et al. .................. 715/716 |
| 7,119,851 | B2 | 10/2006 | Ono |
| 7,511,765 | B2 | 3/2009 | Ono |
| 7,975,283 | B2 * | 7/2011 | Bedingfield, Sr. ............. 725/95 |
| 2002/0181936 | A1 | 12/2002 | Yuen et al. |
| 2003/0117430 | A1 * | 6/2003 | Reynolds et al. ............. 345/721 |
| 2003/0142139 | A1 * | 7/2003 | Brown et al. ................. 345/800 |
| 2003/0142235 | A1 | 7/2003 | Ono |
| 2004/0034866 | A1 | 2/2004 | Yuen et al. |
| 2004/0201608 | A1 * | 10/2004 | Ma et al. ....................... 345/719 |
| 2004/0261108 | A1 | 12/2004 | Yuen et al. |
| 2006/0095398 | A1 * | 5/2006 | Bhaskaran ....................... 707/1 |
| 2006/0107226 | A1 * | 5/2006 | Matthews et al. ............. 715/766 |
| 2006/0161861 | A1 * | 7/2006 | Holecek et al. ............... 715/782 |
| 2006/0203126 | A1 | 9/2006 | Ono |
| 2006/0218504 | A1 | 9/2006 | Hiroi et al. |
| 2006/0236360 | A1 | 10/2006 | Yuen et al. |
| 2006/0253791 | A1 * | 11/2006 | Kuiken et al. ................. 715/766 |
| 2007/0214426 | A1 * | 9/2007 | Ruelle et al. .................. 715/767 |
| 2008/0059904 | A1 * | 3/2008 | Abbey et al. .................. 715/802 |
| 2008/0184293 | A1 | 7/2008 | Yuen et al. |
| 2009/0115899 | A1 | 5/2009 | Ono |
| 2009/0307724 | A1 | 12/2009 | Yuen et al. |
| 2014/0082498 | A1 * | 3/2014 | XIANG et al. ................ 715/719 |

FOREIGN PATENT DOCUMENTS

| | | | |
|---|---|---|---|
| EP | 1 250 003 | A1 | 10/2002 |
| EP | 1 330 118 | A1 | 7/2003 |
| EP | 1 675 392 | A2 | 6/2006 |
| EP | 1 686 797 | A2 | 8/2006 |
| EP | 1 933 552 | A2 | 6/2008 |
| EP | 2 134 085 | A2 | 12/2009 |
| JP | 5-181634 | | 7/1993 |
| JP | 5-274106 | | 10/1993 |
| JP | 5-346773 | | 12/1993 |
| JP | 9-274553 | | 10/1997 |
| JP | 2000-507408 | | 6/2000 |
| JP | 2002-271752 | | 9/2002 |
| JP | 2004-221934 | | 8/2004 |
| JP | 2005-100132 | | 4/2005 |
| JP | 2006-268367 | | 10/2006 |
| WO | 97/34414 | | 9/1997 |

OTHER PUBLICATIONS

International Search Report for PCT/JP2007/066848, mailed Nov. 27, 2007.

Japanese Office Action issued Sep. 25, 2012 in corresponding Japanese Patent Application No. 2009-529910.

* cited by examiner

FIG. 4

| Z-DIRECTION DISPLAY ORDER | WINDOW IDENTIFIER | WINDOW NAME | MOVING PICTURE |
|---|---|---|---|
| 1 | 12345678 | Excel | No |
| 2 | 23456789 | Word | No |
| 3 | 34567891 | DigitalTVBox | Yes |

FIG. 7

BEFORE PRESSING ONE-SHOT MEDIA BUTTON

| Z-DIRECTION DISPLAY ORDER | WINDOW NAME | MOVING PICTURE |
|---|---|---|
| 1 | Excel | No |
| 2 | Word | No |
| 3 | D:/data | No |
| 4 | D:/ | No |

AFTER PRESSING ONE-SHOT MEDIA BUTTON

| Z-DIRECTION DISPLAY ORDER | WINDOW NAME | MOVING PICTURE |
|---|---|---|
| 1 | DigitalTVBox | Yes |
| 2 | Excel | No |
| 3 | Word | No |
| 4 | D:/data | No |
| 5 | D:/ | No |

FIG. 8

BEFORE PRESSING ONE-SHOT MEDIA BUTTON

| Z-DIRECTION DISPLAY ORDER | WINDOW NAME | MOVING PICTURE |
|---|---|---|
| 1 | Excel | No |
| 2 | Word | No |
| 3 | D:/data | No |
| 4 | DigitalTVBox | Yes |
| 5 | D:/ | No |

AFTER PRESSING ONE-SHOT MEDIA BUTTON

| Z-DIRECTION DISPLAY ORDER | WINDOW NAME | MOVING PICTURE |
|---|---|---|
| 1 | DigitalTVBox | Yes |
| 2 | Excel | No |
| 3 | Word | No |
| 4 | D:/data | No |
| 5 | D:/ | No |

FIG. 9

BEFORE PRESSING ONE-SHOT MEDIA BUTTON

| Z-DIRECTION DISPLAY ORDER | WINDOW NAME | MOVING PICTURE |
|---|---|---|
| 1 | DigitalTVBox | Yes |
| 2 | Excel | No |
| 3 | Word | No |
| 4 | D:/data | No |
| 5 | D:/ | No |
| 6 | MyMedia | Yes |
| 7 | NetTV | Yes |

AFTER PRESSING ONE-SHOT MEDIA BUTTON

| Z-DIRECTION DISPLAY ORDER | WINDOW NAME | MOVING PICTURE |
|---|---|---|
| 1 | MyMedia | Yes |
| 2 | DigitalTVBox | Yes |
| 3 | Excel | No |
| 4 | Word | No |
| 5 | D:/data | No |
| 6 | D:/ | No |
| 7 | NetTV | Yes |

FIG. 10

BEFORE PRESSING ONE-SHOT MEDIA BUTTON

| Z-DIRECTION DISPLAY ORDER | WINDOW NAME | MOVING PICTURE |
|---|---|---|
| 1 | DigitalTVBox | Yes |
| 2 | Excel | No |
| 3 | Word | No |
| 4 | D:/data | No |
| 5 | D:/ | No |
| 6 | MyMedia | Yes |
| 7 | NetTV | Yes |

AFTER PRESSING ONE-SHOT MEDIA BUTTON

| Z-DIRECTION DISPLAY ORDER | WINDOW NAME | MOVING PICTURE |
|---|---|---|
| 1 | MyMedia | Yes |
| 2 | Excel | No |
| 3 | Word | No |
| 4 | D:/data | No |
| 5 | D:/ | No |
| 6 | NetTV | Yes |
| 7 | DigitalTVBox | Yes |

FIG. 11

BEFORE PRESSING ONE-SHOT MEDIA BUTTON

| Z-DIRECTION DISPLAY ORDER | WINDOW NAME | MOVING PICTURE |
|---|---|---|
| 1 | Excel | No |
| 2 | Word | No |
| 3 | D:/data | No |
| 4 | DigitalTVBox | Yes |
| 5 | D:/ | No |
| 6 | MyMedia | Yes |

AFTER PRESSING ONE-SHOT MEDIA BUTTON

| Z-DIRECTION DISPLAY ORDER | WINDOW NAME | MOVING PICTURE |
|---|---|---|
| 1 | DigitalTVBox | Yes |
| 2 | Excel | No |
| 3 | Word | No |
| 4 | D:/data | No |
| 5 | D:/ | No |
| 6 | MyMedia | Yes |

DISPLAY CONTROL DEVICE AND INPUT DEVICE

CROSS REFERENCE TO RELATED APPLICATIONS

This is a continuation of Application, filed under 35 U.S.C. §111(a) of International Application PCT/JP2007/066848, filed on Aug. 30, 2007, the contents of which are herein wholly incorporated by reference.

BACKGROUND

The present application relates to a display control method of controlling a back-and-forth order of display areas displayed in a back-and-forth relation on a display device.

Such a conventional technology exists that in the case of changing over a mode from a display mode of displaying both of a picture from broadcasting waves and a picture from a recording medium to a display mode of displaying only the picture from the broadcasting waves, reproduction of the picture from the recording medium is automatically temporarily stopped, and, when returning to the display mode of displaying both of the pictures, the reproduction of the picture from the recording medium automatically resumes (refer to Patent document 1).

Further, a technology for preventing a user from missing a chance to acquire the information is exemplified by a technology (refer to Patent document 2) of setting a picture displayed within an electronic program guide (EPG) to a picture of a channel that is viewed just before displaying the EPG and a technology (refer to Patent document 3) which enables the user to check a picture the user missed seeing and a sound the user missed listening to by sequentially recording input signals.

[Patent document 1] Japanese Patent Laid-Open Publication No. 2004-221934
[Patent document 2] Japanese Unexamined Patent Publication No. 2000-507408
[Patent document 3] Japanese Patent Laid-Open Publication No. 2002-271752

SUMMARY OF DISCLOSURE

Specifically, the present device is a display control device in a computer having a display area management function to manage a display area displayed in a back-and-forth relation on a display device and a plurality of moving picture reproducing functions, the display control device including: a detecting unit to detect a predetermined operation conducted by use of an input device; an extracting unit to extract, in response to an event that the detecting unit detects the predetermined operation, a moving picture display area defined as the display area linked to any one of the plurality of moving picture reproducing functions on the basis of information acquired from the display area management function; and a changing unit to change a back-and-forth order of the display areas so that the moving picture display area extracted by the extracting unit is displayed on the foremost plane of the display device.

The object and advantage of the embodiment will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF THE DRAWINGS

FIG. 4 is a diagram illustrating contents of information contained in window information acquired from OS in the embodiment.

FIG. 7 is a diagram illustrating a transition of a window Z-direction display order in the case of having none of the window to which a moving picture reproducing application is linked in the embodiment.

FIG. 8 is a diagram illustrating the transition of the window Z-direction display order in the case of having one window to which the moving picture reproducing application is linked in the embodiment.

FIG. 9 is a diagram (1) illustrating the transition of the window Z-direction display order in the case of having two or more windows linked to the moving picture reproducing applications in the embodiment.

FIG. 10 is a diagram (2) illustrating the transition of the window Z-direction display order in the case of having two or more windows linked to the moving picture reproducing applications and displaying a moving picture window on the foremost plane in the embodiment.

FIG. 11 is a diagram illustrating the transition of the window Z-direction display order in the case of having two or more windows linked to the moving picture reproducing applications and displaying a window other than the moving picture window on the foremost plane in the embodiment.

DETAILED DESCRIPTION

<First Embodiment>

An embodiment of a display control device according to the present disclosure, a method and a program which are related to processes executed by the same device, will hereinafter be described with reference to the drawings.

Figure 1:
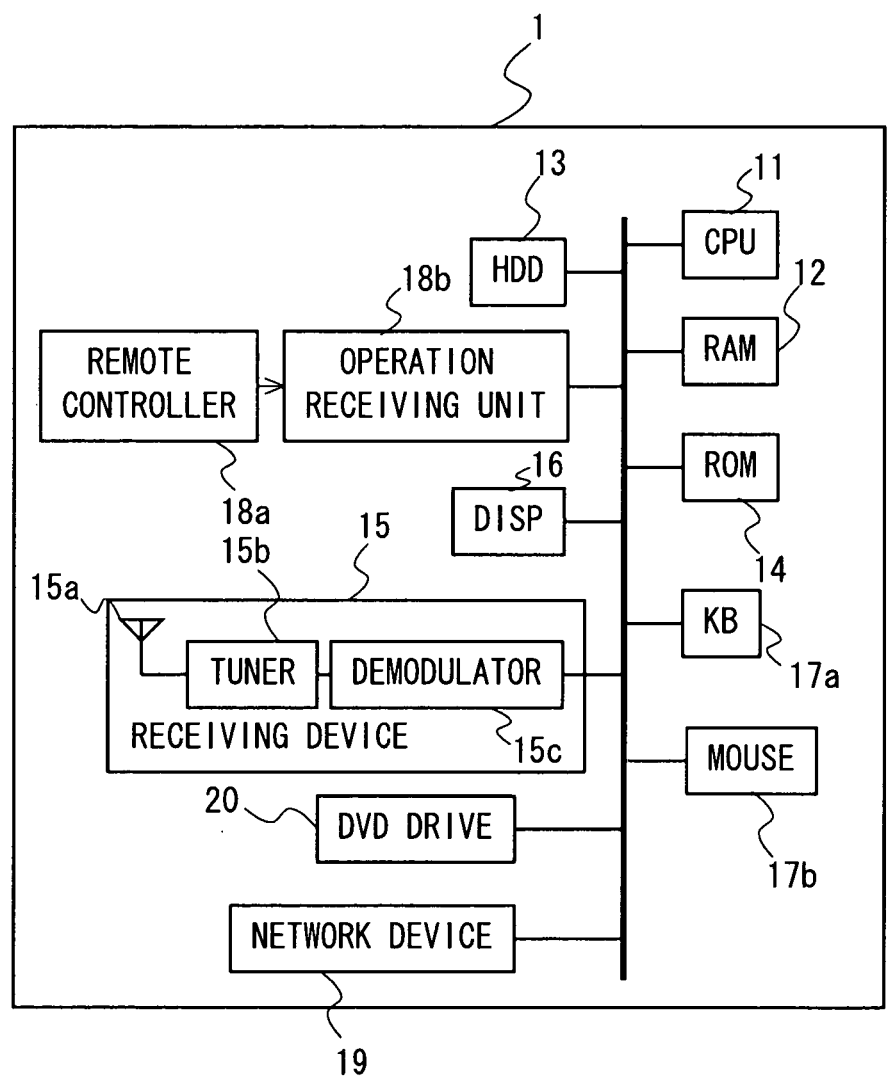
FIG. 1 is a diagram illustrating an outline of hardware architecture of a personal computer including a display control device in an embodiment.

FIG. 1 is a diagram illustrating an outline of a hardware architecture of a personal computer 1 equipped with a display control device in the embodiment. The personal computer 1 includes a CPU (Central Processing Unit) 11, a main storage device such as a RAM (Random Access Memory) 12, an auxiliary storage device such as an HDD (Hard Disk Drive) 13, a ROM (Read Only Memory) 14, a receiving device 15, a network device 19, a DVD drive 20, a remote controller 18a, a remote controller operation receiving unit 18b, a display device such as a display 16, a keyboard 17a, a mouse 17b, etc.

The HDD 13 is installed with an operating system (OS) for managing the system, a device driver for controlling devices held by or connected to the personal computer 1 and applications started up by the personal computer 1.

Note that the OS in the embodiment includes a window management function 27 which manages windows displayed in a multi window system on the display 16. Further, the HDD 13 is installed with a plurality of moving picture reproducing applications 28a, 28b, 28c, i.e., a TV reproducing application 28a, a DVD moving picture reproducing application 28b and a network distribution moving picture reproducing application 28c, in which the CPU 11 executing the moving picture reproducing applications 28a, 28b, 28c processes signals acquired from the network device 19 etc, thereby displaying the moving picture in the window on the display 16.

Figure 2:
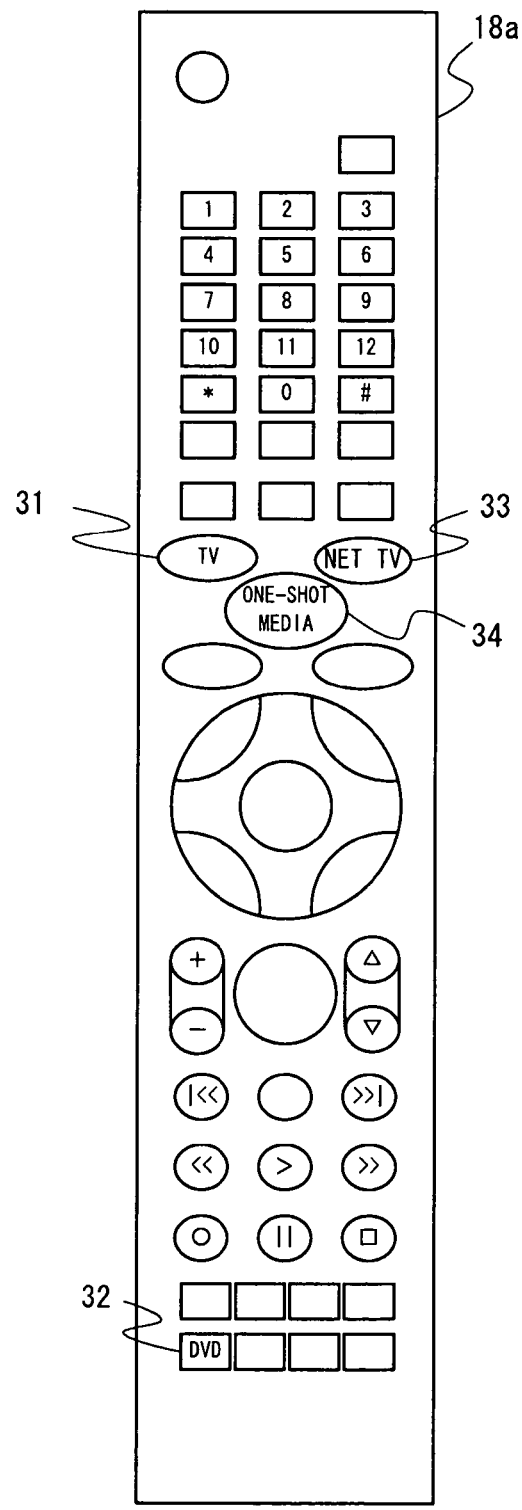
FIG. 2 is a diagram illustrating a remote controller according to the embodiment.

The remote controller 18a is a so-called infrared-ray system remote controller 18a, and the remote controller operation receiving unit 18b, which supports this infrared-ray system, receives the infrared-rays transmitted from the remote controller 18a, thus accepting an operation content of the remote controller 18a. FIG. 2 is a diagram illustrating the remote controller 18a according to the embodiment. The remote controller 18a includes a TV button 31 used dedicatedly for starting up and invoking the TV reproducing application 28a, a DVD button 32 used for starting up and invoking the DVD moving picture reproducing application 28b, a network TV button 33 used for starting up and invoking the network distribution moving picture reproducing application 28c, and a [one-shot media] button 34. The user can, by pressing these buttons, start up the respective moving picture reproducing applications, invoke the respective moving picture reproducing applications running on a background, and restore the system from a power saving mode of the personal computer 1.

The receiving device 15 includes an antenna 15a, a tuner 15b and a demodulator 15c, and is controlled by the CPU 11 which executes the device driver. The receiving device 15 receives broadcasting waves by use of the antenna 15a, and selects a channel by employing the tuner 15b. Then, the receiving device 15 executes a demodulating process based on the broadcasting waves of the channel by use of the demodulator 15c and a generating process of a compressed moving picture data stream (which is TS signals in the embodiment). The generated TS signals are output via a bus. The CPU 11, which executes the TV reproducing application 28a, generates pictures of individual frames forming the moving picture on the basis of the TS signals output from the receiving device 15 (a decoding process). Then, video signals based on the generated pictures are output to the display 16, and the display 16 displays the video (moving picture) based on the video signals, thereby enabling a user to view a TV broadcast.

The network device 19 is a device for performing wired or wireless communications with the outside and is controlled by the CPU 11 which executes the device driver. The network device 19 receives packets transmitted from a server on the network via the network such as the Internet, and outputs the received packets via the bus. The CPU 11 executing the network distribution moving picture reproducing application 28c generates the pictures of the respective frames forming the moving picture on the basis of the packets output from the network device 19 (the decoding process). Then, the video signals based on the thus-generated pictures are output to the display 16, and the display 16 displays the video (moving picture) based on the video signals, thereby enabling the user to view the moving picture distributed via the network.

The DVD drive 20 is a device for reading information recorded on the inserted DVD and is controlled by the CPU 11 which executes the device driver. The DVD drive 20 outputs the information read from the DVD. The CPU 11, which executes the DVD moving picture reproducing application 28b, generates the pictures of the respective frames forming the moving picture on the basis of the information output from the DVD drive 20 (the decoding process). Then, the video signals based on the thus-generated pictures are output to the display 16, and the display 16 displays the video based on the video signals, thereby enabling the user to view the DVD video.

Figure 3:
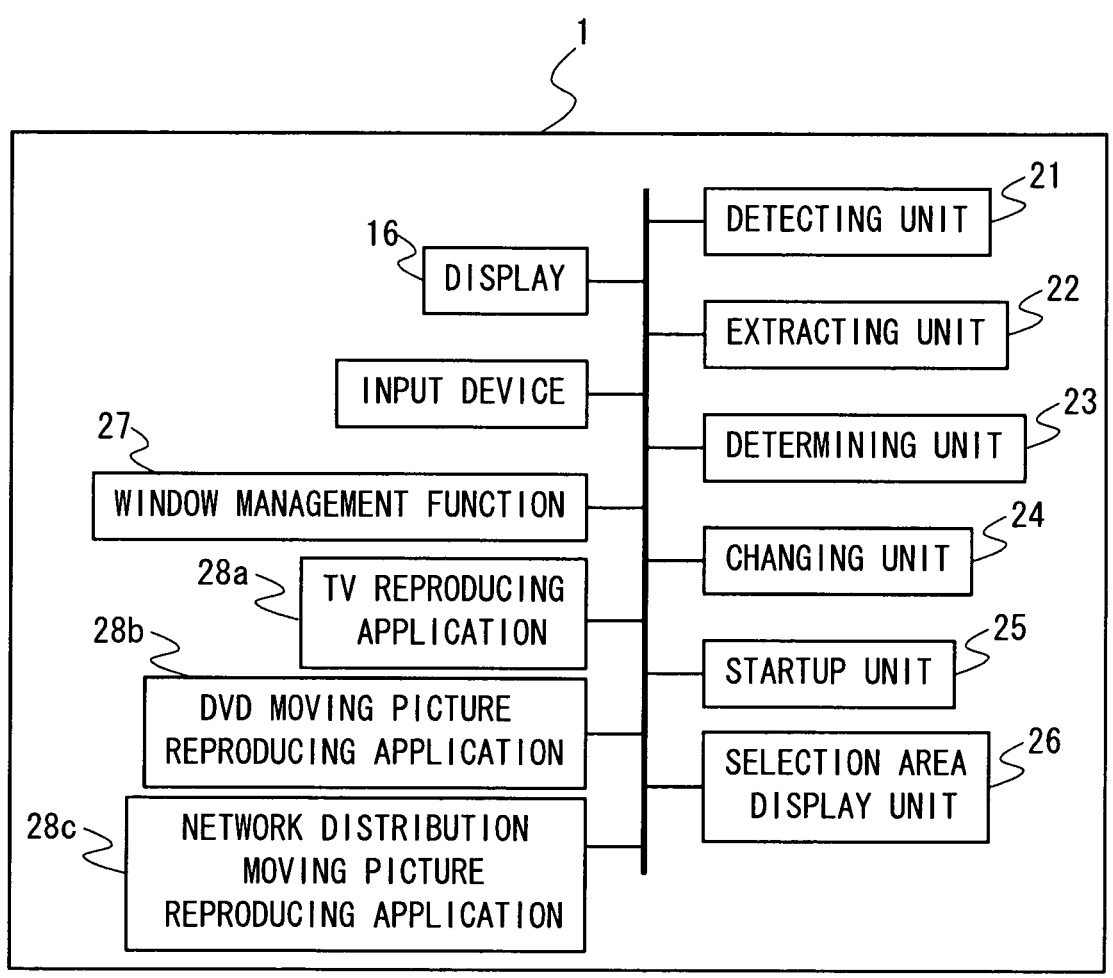
FIG. 3 is a diagram illustrating an outline of a functional configuration of the personal computer including the display control device in the embodiment.

FIG. 3 is a diagram illustrating an outline of a functional configuration of the personal computer 1 including the display control device in the embodiment. The CPU 11 reads the OS, the device driver and a display control program each installed onto the HDD 13, then develops these programs on the RAM 12 and interprets/executes the developed programs to thereby control the respective components (functions) provided in the personal computer 1, whereby the personal computer 1 having the hardware architecture depicted in FIG. 1 functions as a display control device including a detecting unit 21, an extracting unit 22, a determining unit 23, a changing unit 24, a startup unit 25 and a selection area display unit 26. The individual function units described above may be, individually or as an aggregation of these plural function units, realized by dedicated pieces of hardware.

The detecting unit 21 detects an operation of invoking the moving picture reproducing application. In the embodiment, an operation of pressing the one-shot media button 34 provided on the remote controller 18a is defined as the invoking operation of the moving picture reproducing application. The invoking operation of the moving picture reproducing application is not, however, limited to pressing the one-shot media button 34 on the remote controller 18a but may involve operations such as pressing a one-shot media button (with its illustration being omitted) provided on the keyboard 17a, inputting a pre-assigned short-cut by use of the keyboard 17a and manipulating an one-shot media invoking icon (with its illustration being omitted) displayed on the display 16 by employing the mouse 17b.

The extracting unit 22, in response to an event that the detecting unit 21 detects the invoking operation, acquires a name of a function linked to the window displayed at the present on the display 16, and compares the acquired name with a list of moving picture reproducing application names listed beforehand, thereby extracting the window (which will hereinafter be referred to a [moving picture window]) linked to a plurality of moving picture reproducing applications.

FIG. 4 is a diagram illustrating contents of information contained in the window information acquired from the OS in the embodiment. The window information contains a window identifier, a window name and a widow Z-direction display order indicating which number counted from the foremost position the window is displayed. Herein, the Z-direction display order is that when the display screen of the display 16 is set as an XY-plane, the display order of the windows is determined on the premise that the windows are deemed to be stacked in a Z-axis direction. Further, in the embodiment, the acquired window information is attached with information for identifying whether or not each window is the moving picture window on the basis of a result of the extraction by the extracting unit 22.

The determining unit 23, when the extracting unit extracts the plurality of moving picture windows, determines whether the foremost window is the moving picture window or not. The determining unit 23 refers to the information indicating whether or not the window is the moving picture window in the window information of the window assigned a Z-direction display order "1", thereby determining whether the foremost window is the moving picture window or not.

The changing unit 24 changes a back-and-forth order of the windows in a way that instructs the window management function 27 of the OS to display the moving picture window extracted by the extracting unit 22 on the foremost plane on the screen of the display device.

The startup unit 25, if the extracting unit 22 does not extract the moving picture window, starts up any one of the plurality of moving picture reproducing applications 28a, 28b, 28c provided in the personal computer 1. Note that the moving picture reproducing application started up by the startup unit 25 may be the application which is previously set when shipped from a factory of the personal computer 1 and at the initial setting, and may also be the application which is set by the user. In the embodiment, it is assumed that the TV reproducing application 28a [DigitalTVBox] (see FIG. 7), which is set when shipped from the factory, is started up.

The selection area display unit 26 defines a predetermined selection area on the display 16 and displays, in the selection area, an icon image (a one-shot media invoking icon) for prompting the user to select this selection area. Herein, the detecting unit 21 detects, as the invoking operation of the moving picture reproducing application, that the area at which the icon is displayed by use of the mouse 17b etc is selected.

Figure 5:
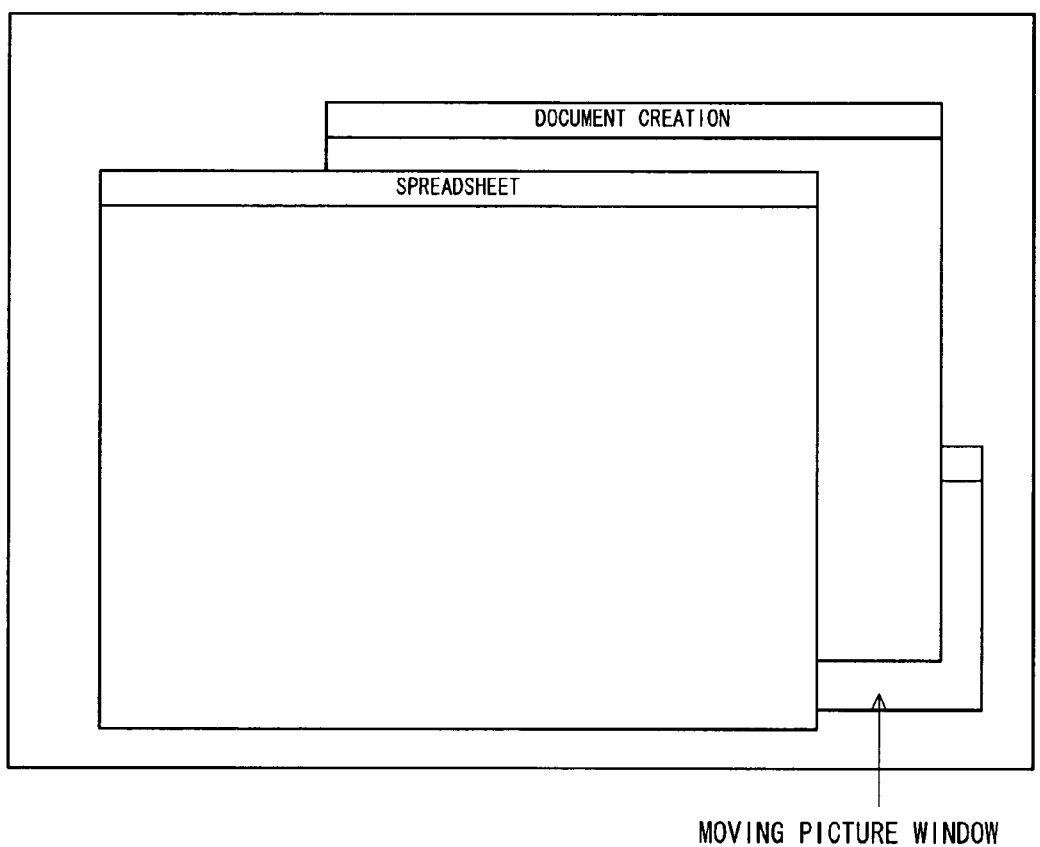
FIG. 5 is a diagram illustrating an image of a screen displayed on a display according to the embodiment.

FIG. 5 is a diagram illustrating an image of the screen displayed on the display 16. The user, while performing the operation by use of a spreadsheet application and a document creating application, gets the personal computer 1 to reproduce the video by employing the moving picture reproducing application. Herein, the window linked to the spreadsheet application is displayed on the foremost plane, and the window linked to the moving picture reproducing application is hidden behind backsides of the widows linked to the spreadsheet application and the document creating application but is partially displayed.

Herein, an assumption is, for example, that a sports relay broadcast of the TV broadcasting is reproduced by the moving picture reproducing application and such a situation occurs that the user, with the cheering breaking out etc, abruptly has an interest in a content of the video and wants to, the user thinks, immediately check the video. In this case, according to the personal computer 1 functioning as the display control device in the embodiment, the user can, by pressing the one-shot media button 34 on the remote controller 18a, get the personal computer 1 to display the window linked to the moving picture reproducing application on the foremost plane irrespective of whether the moving picture reproducing application of the window behind the spreadsheet window is the TV reproducing application 28a or the DVD moving picture reproducing application 28b or the network distribution moving picture reproducing application 28c.

Figure 6A:
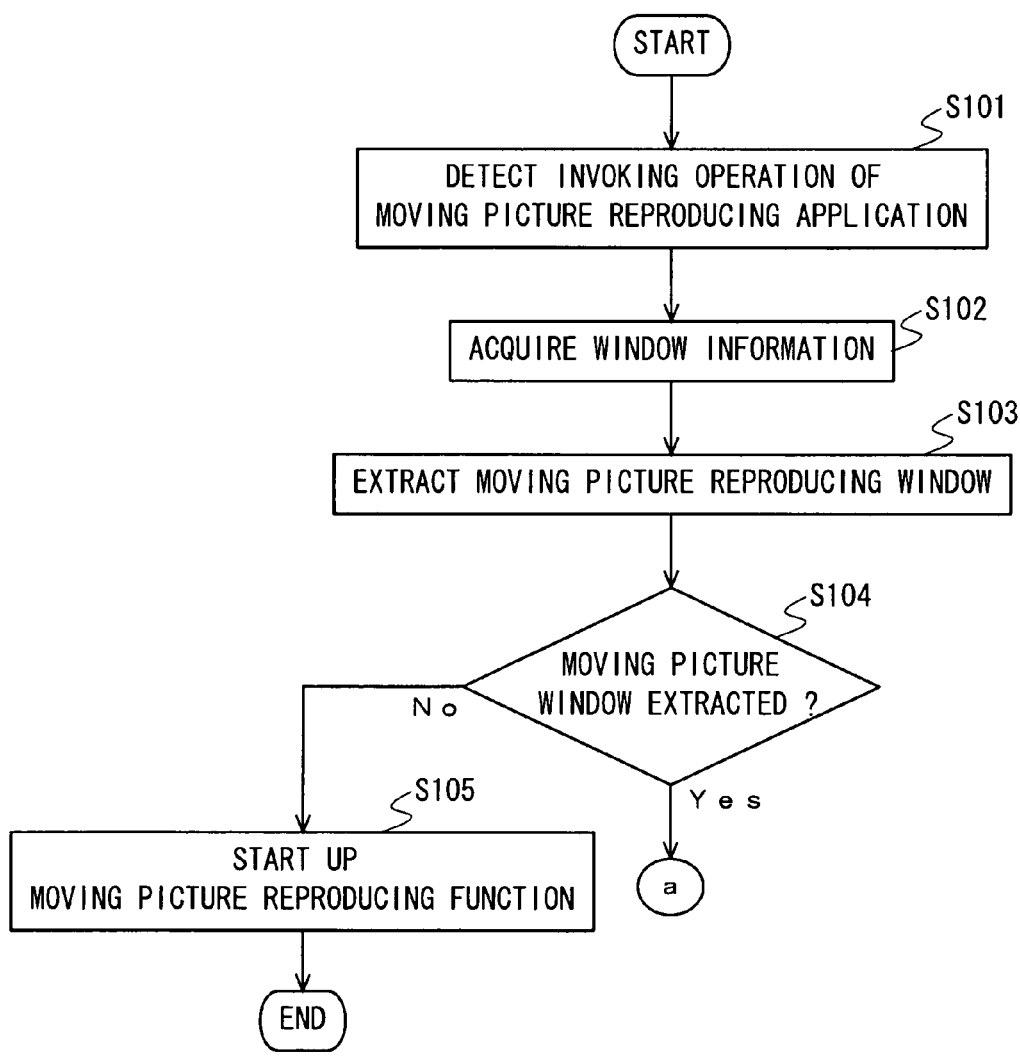
FIG. 6A is a flowchart (a) illustrating a flow of a display control process according to the embodiment.
Figure 6B:
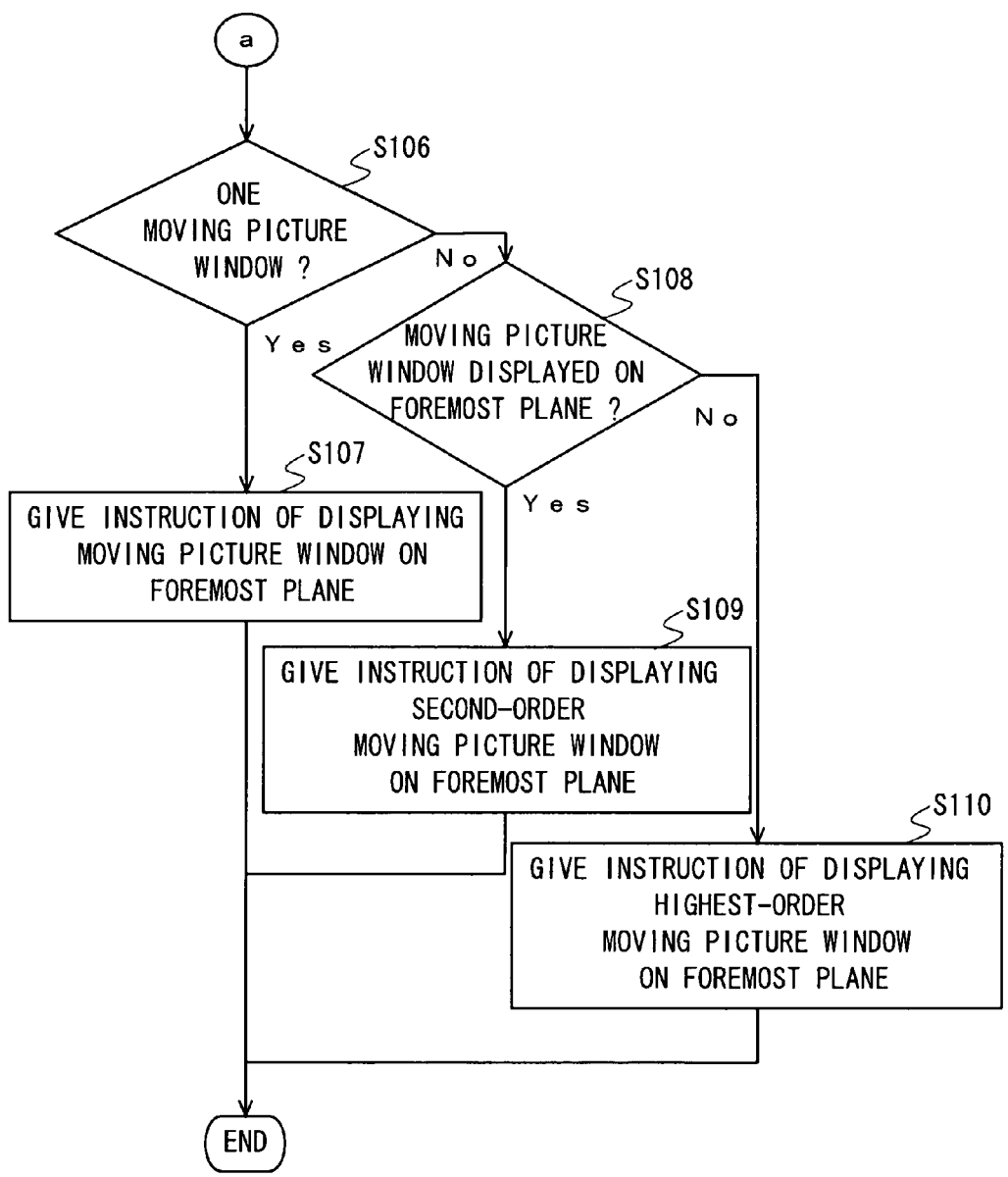
FIG. 6B is a flowchart (b) illustrating the flow of the display control process according to the embodiment.

FIGS. 6A and 6B illustrate a flowchart depicting a flow of the display control process. The process illustrated in the flowchart is executed after booting the personal computer 1 and waits for the user to conduct the operation of invoking the moving picture reproducing application.

In step S101, the invoking operation of the moving picture reproducing application is detected. The detecting unit 21 detects through the remote controller operation receiving unit 18b that the one-shot media button 34 on the remote controller 18a is pressed, thus detecting the invoking operation of the moving picture reproducing application. Further, the invoking operation of the moving picture reproducing application may also be detected by detecting that the one-shot media invoking icon is selected by use of the mouse 17b etc. Thereafter, the processing proceeds to step S102.

In steps S102 and S103, the window information is acquired, and the window linked to the moving picture reproducing application is extracted. The extracting unit 22 acquires the information on the window started up at the present from the OS (step S102). Then, the extracting unit 22 reads the moving picture reproducing application name list stored beforehand in the HDD 13, and compares this name list with the window name contained in the window information, thereby extracting the window linked to the moving picture reproducing application (step S103). In the moving picture reproducing application name list, the names of the moving picture reproducing applications, which are pre-installed in the shipping status are, listed. For others, the names of the moving picture reproducing applications that are not pre-installed may also be listed. Further, the moving picture reproducing application name list may be a list to which the names of the moving picture reproducing applications are added by the user's operation.

In the embodiment, the extracted moving picture window is retained in a way that stores the window information in the RAM and attaches information representing whether or not the window is the moving picture window thereto (see FIG. 4). The extracted moving picture window may also be, however, retained by use of an identifier of this window. Moreover, the moving picture window extracting method may involve adopting methods other than the comparison with the moving picture reproducing application name list. For example, if the window management function 27 of the OS is capable of recognizing a type of the application related to each window to be managed, the moving picture window can be specified by giving a query to the window management function 27 of the OS. Thereafter, the processing proceeds to step S104.

In step S104, it is determined whether or not there are one or more windows to which the moving picture reproducing applications are linked. The changing unit 24 determines whether one or more windows to which the moving picture reproducing applications are linked are extracted or not. When determining that there are one or more windows to which the moving picture reproducing applications are linked, the processing proceeds to step S106. Whereas if it is determined that there is none of the window to which the moving picture reproducing application is linked, the processing advances to step S105.

In step S105, the moving picture reproducing application is started up. FIG. 7 is a diagram illustrating transition of the window Z-direction display order if there is no window to which the moving picture reproducing application is linked in the embodiment. The startup unit 25 starts up the moving picture reproducing application by instructing the OS to start up any one, i.e., the preset moving picture reproducing application, of the plurality of moving picture reproducing applications provided in the personal computer 1, and gets the window, to which the moving picture reproducing application is linked, displayed on the foremost plane. Namely, the startup unit 25, if there is no in-startup moving picture reproducing application though the detecting unit 21 has detected the invoking operation such as pressing the one-shot media button 34 etc, construes the accepted invoking operation as the startup instruction of the moving picture reproducing application, and thus starts up the moving picture reproducing application. Thereafter, the process illustrated in the flowchart is terminated.

In steps S106 and S107, it is determined whether or not there is one window to which the moving picture reproducing application is linked, and, if determined to be one window, the window concerned is displayed on the foremost plane. FIG. 8 is a diagram illustrating the transition of the window Z-direction display order when there is one window to which the moving picture reproducing application is linked in the embodiment. The changing unit 24 determines based on the result of the extraction in step S103 whether or not there is one window to which the moving picture reproducing application is linked (step S106), and, if determined to be one moving picture window, notifies the OS window management function 27 of the window identifier, thereby getting the window, to which the moving picture reproducing application is linked, displayed on the foremost plane. Thereafter, the process illustrated in the flowchart is finished. Whereas if determined not to be one moving picture window in step S106, the processing proceeds to step S108.

In step S108, it is determined whether or not the window on the foremost plane is the window related to the moving picture reproducing application. The determining unit 23 determines based on the result of the extraction in step S103 whether or not the window on the foremost plane (which is, i.e., assigned the Z-direction display order "1") in the windows with the window information being acquired in step S102 is the window linked to the moving picture reproducing application. If the window on the foremost plane is determined to be the moving picture window, the processing proceeds to step S109. Whereas if the window on the foremost plane is determined not to be the moving picture window, the processing diverts to step S110.

In step S109, the moving picture window, which is second from the highest of the windows, is displayed on the foremost plane. FIG. 9 is a diagram illustrating the transition of the window Z-direction display order in the embodiment in such a case that there are two or more windows linked to the moving picture reproducing applications, and the moving picture window is displayed on the foremost plane. The changing unit 24 notifies the OS window management function 27 of the identifier of the moving picture window located nearest to the user's side (which is, i.e., the window having the smallest Z-direction display order in the two or more moving picture windows) in the windows, excluding the foremost window (in this case, the moving picture window is displayed on the foremost plane), of which pieces of window information are acquired in step S102, thereby getting the second moving picture window counted from the highest of the moving picture windows displayed on the foremost plane. Thereafter, the process illustrated in the flowchart is finished.

Note that in the process illustrated in the flowchart, the second moving picture window counted from the highest is displayed on the foremost plane, and hence, if the three or more moving picture windows are opened, the two moving picture windows on the user's side are merely alternately changed over even by pressing the one-shot media button 34 plural number of times. Therefore, the moving picture windows after the third window counted from the user's side can not appear on the front plane by simply manipulating the one-shot media button 34. Herein, a scheme given by way of another embodiment is that there are two or more windows linked to the moving picture reproducing applications, and the moving picture window is displayed on the foremost plane, in which case after displaying the second moving picture window counted from the highest on the foremost plane, the window remaining displayed on the foremost plane just before this operation may be shifted down to the lowest (see FIG. 10). With this scheme, even in the case of opening the three or more moving picture windows, the moving picture window on the foremost plane is changed over in sequence each time the one-shot media button 34 is merely pressed, thus enabling the now-opening moving picture window to easily go round. Incidentally, if the moving picture window is located on the foremost plane, the moving picture window has already been displayed on the foremost plane even by invoking the moving picture reproducing application, and therefore no special process may be executed.

In step S110, the moving picture window located nearest to the user's side in the moving picture windows is displayed on the foremost plane. FIG. 11 is a diagram illustrating the transition of the window Z-direction display order in such a case that there are two or more windows linked to the moving picture reproducing applications in the embodiment, and the window other than the moving picture window is located on the foremost plane. The changing unit 24 notifies the OS window management function 27 of the identifier of the moving picture window located nearest to the user's side (which is, i.e., the moving picture window having the smallest Z-direction display order) in the moving picture windows extracted in step S103, whereby the moving picture window located nearest to the user's side in the moving picture windows is displayed on the foremost plane. Thereafter, the process depicted in the flowchart is finished.

According to the embodiment, the moving picture window is displayed on the foremost plane by pressing the one-shot media button 34 irrespective of the in-startup moving picture reproducing application, and hence it is unnecessary for the user to select the in-startup moving picture reproducing application and to have the time for considering the content of the operation corresponding to the moving picture reproducing application. Namely, according to the embodiment, the operation time is reduced, a possibility of causing a misoperation decreases, and a [while-doing-view] can be comfortably performed.

<Second Embodiment>

A personal computer has hitherto been loaded with a variety of moving picture reproducing functions such as a television reproducing function, a DVD (Digital Versatile Disc) video reproducing function and a network distribution moving picture reproducing function. Each of these respective functions is started up by performing an invoking operation prepared for every moving picture reproducing function via an input device provided on the personal computer.

Herein, the personal computer at the present time is equipped with a GUI (Graphical User Interface) including a so-called window display function and therefore, while using mainly functions (a document creating function, a spreadsheet function, etc) other than the moving picture reproducing function, enables the picture reproduced by the moving picture reproducing function to be displayed in the widow other than the windows linked to the mainly-used functions. Namely, the user can, while using each of the functions other than the moving picture reproducing function by displaying this function in the window occupying a large proportion of a display screen of the personal computer as a main purpose of the personal computer, perform a so-called [while-doing-view] by laying out the window in which to display the picture based on the moving picture reproducing function at a corner or on the backside (which is a status where another window is displayed in superposition on the picture-displayed window) of the display screen.

In this case, it follows that the user performs operations while checking the picture at the corner of the screen or while hearing only sounds (voices). Such being the case, if abruptly the user is fascinatingly interested in a content of the picture (e.g., the cheering breaks out etc when hearing only the sounds (voices) of a sports relay broadcast) and wants to, the user thinks, immediately check the picture, in which case the personal computer having the conventional moving picture reproducing function entails conducting the invoking operation of the moving picture reproducing application linked to the target moving picture reproducing function by operating an input device such as a remote controller, a keyboard and a mouse. Particularly, in the personal computer including a plurality of moving picture reproducing functions, the operation is different for every moving picture reproducing function, and hence it is extremely troublesome and time-consuming for the user to determine a content of the proper operation and perform the operation. More specifically, in the case of operating the remote controller, it is necessary to determine and press a button linked to a target moving picture reproducing function from within respective buttons linked to the plurality of moving picture reproducing functions, and, in the case of manipulating a mouse, it is also necessary to conduct a selecting operation while adjusting a pointer by moving the mouse after determining the window linked to the target moving picture reproducing function from within the information of many windows to which functions other than the moving picture reproducing function are linked, which are displayed on a display screen.

This type of operation system gets the user confused who is unaccustomed to the operations of especially electronic devices, and even the user accustomed to the operation might feel troublesome and time-consuming in the case of wanting to access the moving picture as soon as possible. Further, if the window linked to the moving picture reproducing function is hidden behind another window and a window name thereof can not be therefore checked and if the window name itself is not displayed in the window linked to the moving picture reproducing function, this is a cause of getting the user further confused and to feel troublesome and time-consuming. Moreover, if a different moving picture reproducing function is started up due to a mis-operation, such a problem arises that the time till the picture desired to be checked by the user reaches a viewable status is further elongated.

It is an object, in view of the problems described above, to provide a display control device having, in the case of setting a window linked to any one of a plurality of moving picture reproducing functions to appear on the foremost plane, no necessity for getting a user to make a determination about an invoking operation corresponding to the moving picture reproducing function related to the window desired to appear on the foremost plane.

The display control device, for solving the problem described above, enables the user to have no necessity for making the determination about the invoking operation corresponding to the moving picture reproducing function related to the window desired to appear on the foremost plane by displaying, when performing a predetermined operation, a display area linked to any one of the plurality of moving picture reproducing functions on the foremost plane.

Specifically, the present device is a display control device in a computer having a display area management function to manage a display area displayed in a back-and-forth relation on a display device and a plurality of moving picture reproducing functions, the display control device including: a detecting unit to detect a predetermined operation conducted by use of an input device; an extracting unit to extract, in response to an event that the detecting unit detects the predetermined operation, a moving picture display area defined as the display area linked to any one of the plurality of moving picture reproducing functions on the basis of information acquired from the display area management function; and a changing unit to change a back-and-forth order of the display areas so that the moving picture display area extracted by the extracting unit is displayed on the foremost plane of the display device.

Herein, the display area is exemplified by the window managed by the OS provided with a GUI function. Further, generally at the present, the display device involves using a display device which displays two-dimensional images on one plane, however, the terminology [back-and-forth] used herein connotes, in the case of the display device which displays the two-dimensional images, a relation between this side (a user's side) and a depthwise side on the assumption that the display screen has a depth.

Further, the computer according to the present device is provided with a plurality of moving picture reproducing functions such as a TV reproducing function, a function of reproducing the moving picture recorded on a recording medium like a DVD and a HDD, and a function of reproducing the moving picture received via a network. Conventionally, if the user wants to display the moving picture display area on the foremost plane, the user is required to perform an operation corresponding to the moving picture reproducing function (of the moving picture display area) desired to be displayed on the foremost plane in the plurality of moving picture reproducing functions, however, according to the present device, even when the function (the display area) desired to be displayed on the foremost plane is whichever moving picture reproducing function, the moving picture reproducing function can be displayed on the foremost plane by performing only the predetermined operation. Namely, according to the present device, the user can immediately access the want-to-view moving picture without hesitating to conduct the operation.

Herein, the extracting unit acquires the information about the display area owing to the display area management function of the computer and thus extracts the moving picture display area on the basis of the acquired information, however, a specific extracting method involves using a variety of methods such as a method based on a name of the function linked to the display area and a method based on function type information held by the display area management function, and whichever method may be adopted.

For example, the extracting unit may acquire a name of the function linked to the display area from the display area management function, then compares the acquired name with names of the plurality of previously-prepared moving picture reproducing functions, and thus extracts the moving picture display area.

Moreover, if the display area management function has information from which a type of the function (e.g., the reproduction of the moving picture, the creation of a document, the spreadsheet, etc) linked to the display area can be identified, this function type information is acquired from the display area management function, and the moving picture display area may be thus extracted.

Furthermore, the changing unit may change, even when the extracting unit extracts the plurality of moving picture display areas, the back-and-forth order of the display areas so that the moving picture display area having the back-and-forth order closest to the foremost plane in the plurality of extracted moving picture display areas is displayed on the foremost plane of the display device.

Namely, the changing unit, in the case of having the plurality of moving picture display areas, determines that the moving picture display area closest to the user's side is the moving picture display area in which the moving picture having the highest priority level to the user is displayed, and therefore displays this moving picture display area on the foremost plane. With this contrivance, even when the plurality of moving picture display areas are opened simultaneously, the user can access the proper moving picture by performing only the predetermined operation without hesitating to conduct the operation.

Moreover, the display control device may further include a determining unit to determine, when the extracting unit detects the plurality of moving picture display areas, whether the display area on the foremost plane is the moving picture display area or not, wherein the changing unit may change, when the determining unit determines that the display area on the foremost plane is the moving picture display area, the back-and-forth order of the display areas so that any one of the moving picture areas excluding the moving picture display area on the foremost plane is displayed on the foremost plane of the display device.

Namely, if the predetermined operation is performed when the moving picture display area has already been displayed on the foremost plane, the moving picture displayed on the foremost plane can be changed over by performing only the predetermined operation in a way that displays the moving picture display area located backward on the foremost plane irrespective of whichever moving picture reproducing function is started up currently.

Furthermore, the display control device may further include a startup unit to start up, when the extracting unit does not extract the moving picture display area, any one of the plurality of moving picture reproducing functions.

With this configuration, even in a state where the moving picture reproducing function is not yet started up, any one of the moving picture reproducing functions is started simply by performing the predetermined operation, and the user can start viewing the moving picture without hesitating the conduct the operation.

Further, the detecting unit may detect one operation on the input device as the predetermined operation.

Therefore, the display control device may further comprising a selection area display unit to define a predetermined selection area on a screen of the display device and to display an image or characters for prompting a user to select the selection area in the selection area, wherein the detecting unit may detect, as the predetermined operation, that the predetermined selection area is selected by use of the input device.

Herein, the image and the characters displayed in the selection area are, e.g., an icon image imitating a button and a character string such as [one-shot media]. The detecting unit detects that the user selects the area where the image or the characters are displayed by use of a mouse etc.

Moreover, the display control device may be used together with an input device which follows. Namely, an input device on which to conduct a predetermined operation detected by a detecting unit provided in the display control device includes a predetermined button to generate a predetermined signal when pressed and to get the detecting unit to detect the predetermined operation.

This input device includes a transmitting unit to wirelessly transmit the predetermined signal to the radio receiving unit of the display control device by pressing the predetermined button, and, in the display control device, the detecting unit detects, as the predetermined operation, the radio signal received from the input device.

For instance, the input device is a so-called remote controller, and this remote controller is provided with the predetermined button, whereby the user can immediately access the moving picture simply by pressing the predetermined button absolutely without being aware of which moving picture reproducing function in the plurality of moving picture reproducing functions installed into the computer is currently started up.

Moreover, the processes of the present device can be provided as a method executed by a computer or as a program to make the computer execute the method. Furthermore, this program may be provided in a way that records the program on a recording medium readable by the computer, other devices and machines. Herein, the recording medium readable by the computer etc connotes a recording medium capable of storing information such as data and programs electrically, magnetically, optically, mechanically or by chemical action, which can be read from the computer.

According to the present device, the window linked to any one of the plurality of moving picture reproducing functions is made to appear on the foremost plane, in which case the user has no necessity for making a determination about the invoking operation corresponding to the moving picture reproducing function related to the window desired to appear on the foremost plane.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A display control device running on a processor and having a display area management function to manage display areas displayed in a back-and-forth relation on a display device and a plurality of moving picture reproducing functions, said display control device comprising:
   a processor;
   a detecting unit using the processor to detect a predetermined operation conducted by use of an input device;
   a specifying unit to specify, in response to the predetermined operation that said detecting unit detects, an existing moving picture display area defined as a display area linked to any one of the plurality of moving picture reproducing functions on the basis of information acquired from the display area management function when there is at least one display area linked to any one of the plurality of moving picture reproduction functions;
   a changing unit to change a back-and-forth order of the display areas so that the moving picture display area specified by said specifying unit is displayed on a foremost plane of said display device; and
   a startup unit to start up, when there is not at least one display area linked to any one of the plurality of moving picture reproducing functions and the specifying unit does not specify the moving picture display area, any one of the plurality of moving picture reproducing functions, and display a new moving picture display area that is linked to the moving picture reproducing function started up newly on the foremost plane of the display device.

2. A display control device according to claim 1, wherein said specifying unit acquires a name of the moving picture reproducing function when linked to the at least one display area from the display area management function, then compares the acquired name with names of the plurality of moving picture reproducing functions, and thus specifies the existing moving picture display area.

3. A display control device according to claim 1, wherein said changing unit changes, even when said specifying unit specifies the existing moving picture display area, the back-and-forth order of the display areas so that a first moving picture display area having the back-and-forth order closest to the foremost plane in the plurality of moving picture display areas is displayed on the foremost plane of said display device.

4. A display control device according to claim 1, further comprising a determining unit to determine, when said specifying unit specifies the existing moving picture display area, whether the display area on the foremost plane is the existing moving picture display area or not,
wherein said changing unit changes, when said determining unit determines that the display area on the foremost plane is the existing moving picture display area, the back-and-forth order of the display areas so that any one of a plurality of moving picture display areas excluding the existing moving picture display area is displayed on the foremost plane of said display device.

5. A display control device according to claim 1, wherein the predetermined operation comprises an operation on said input device.

6. A display control device according to claim 5, further comprising a selection area display unit to define a predetermined selection area on a screen of said display device and to display an image or characters for prompting a user to select a selection area in the predetermined selection area,
wherein said detecting unit detects, as the predetermined operation, that the predetermined selection area is selected by use of said input device.

7. The input device according to claim 5, comprising:
a predetermined button to generate a predetermined signal when pressed and to get said detecting unit to detect the predetermined operation.

8. The input device according to claim 7, wherein said display control device comprises a radio receiving unit to receive radio signals and to supply the radio signals to said detecting unit, and
said input device comprises a transmitting unit to wirelessly transmit the predetermined signal to said radio receiving unit of said display control device by pressing said predetermined button.

9. A display control method by which a computer having a display area management function to manage display areas displayed in a back-and-forth relation on a display device and a plurality of moving picture reproducing functions, said display control method comprising:
detecting a predetermined operation conducted by use of an input device;
specifying, in response to the predetermined operation that is detected in said detecting, an existing moving picture display area defined as a display area linked to any one of the plurality of moving picture reproducing functions on the basis of information acquired from the display area management function when there is at least one display area linked to any one of the plurality of moving picture reproduction functions;
changing a back-and-forth order of the display areas so that the moving picture display area specified in said specifying is displayed on a foremost plane of said display device; and
starting up, when there is not at least one display area linked to any one of the plurality of moving picture reproducing functions and the specifying does not specify the moving picture display area, any one of the plurality of moving picture reproducing functions, and display a new moving picture display area that is linked to the moving picture reproducing function started up newly on the foremost plane of the display device.

10. A readable-by-computer non-transitory recording medium recorded with a display control program to make a computer having a display area management function to manage display areas displayed in a back-and-forth relation on a display device and a plurality of moving picture reproducing functions perform the functions of:
detecting a predetermined operation conducted by use of an input device;
specifying, in response to the predetermined operation, an existing moving picture display area defined as a display area linked to any one of the plurality of moving picture reproducing functions on the basis of information acquired from the display area management function when there is at least one display area linked to any one of the plurality of moving picture reproduction functions;
changing a back-and-forth order of the display areas so that the moving picture display area is displayed on a foremost plane of said display device; and
starting up, when there is not at least one display area linked to any one of the plurality of moving picture reproducing functions and the specifying does not specify the moving picture display area, any one of the plurality of moving picture reproducing functions, and display a new moving picture display area that is linked to the moving picture reproducing function started up newly on the foremost plane of the display device.

11. A readable-by-computer non-transitory recording medium recorded with a display control program according to claim 10, wherein said specifying acquires a name of the moving picture reproducing function when linked to the at least one display area from the display area management function, then compares the acquired name with names of the plurality of moving picture reproducing functions, and thus specifies the existing moving picture display area.

12. A readable-by-computer non-transitory recording medium recorded with a display control program according to claim 10, wherein said changing changes, even when said specifying unit specifies the existing moving picture display area, the back-and-forth order of the display areas so that a first moving picture display area having the back-and-forth order closest to the foremost plane in the plurality of moving picture display areas is displayed on the foremost plane of said display device.

13. A readable-by-computer non-transitory recording medium recorded with a display control program according to claim 10, further making said computer form the function of:
determining, when the existing moving picture display area is specified, whether the display area on the foremost plane is the existing moving picture display area or not; and
changing, when the display area on the foremost plane is determined to be the existing moving picture display area, the back-and-forth order of the display areas so that any one of a plurality of moving picture display areas excluding the existing moving picture display area is displayed on the foremost plane of said display device.

14. A readable-by-computer non-transitory recording medium recorded with a display control program according to claim 10, wherein the predetermined operation comprises an operation on said input device.

15. A readable-by-computer non-transitory recording medium recorded with a display control program according to claim 14, further making said computer perform the function of defining a predetermined selection area on a screen of said display device and displaying an image or characters for prompting a user to select a selection area in the predetermined selection area, and detecting, as the predetermined operation, that the predetermined selection area is selected by use of said input device.

16. A readable-by-computer non-transitory recording medium recorded with a display control program according to claim 14, wherein said computer comprises a radio receiving unit to receive radio signals,
said input device comprises a predetermined button to generate a predetermined radio signal when pressed, and
further performing the function of detecting, as the predetermined operation, reception of the predetermined radio signal by said radio receiving unit.

* * * * *